United States Patent [19]

Belmares-Sarabia et al.

[11] 4,223,343
[45] Sep. 16, 1980

[54] ARRANGEMENTS FOR MODIFYING SIGNALS INDICATIVE OF ANAMORPHIC IMAGES

[76] Inventors: Armand Belmares-Sarabia, 161 Mills Pond Rd., St. James, N.Y. 11780; Stanley J. Chayka, 16 Dunnellen Rd., Parsippany, N.J. 07054

[21] Appl. No.: 850,459
[22] Filed: Nov. 10, 1977
[51] Int. Cl.² .................... H04N 3/36; H04N 3/22
[52] U.S. Cl. ........................ 358/54; 358/77; 358/287; 358/214; 358/180; 358/183; 355/52
[58] Field of Search .......... 358/54, 127, 132, 77, 358/78, 287, 4, 214, 6, 8, 180, 183, 216; 355/52; 360/9, 36, 32

[56] References Cited

U.S. PATENT DOCUMENTS

| | | | |
|---|---|---|---|
| 3,097,262 | 7/1963 | Ehrenhaft | 358/180 |
| 3,541,245 | 11/1970 | Wilby | 358/287 |
| 3,821,468 | 6/1974 | Busch | 358/183 |
| 3,824,336 | 7/1974 | Gould | 355/52 |
| 3,863,022 | 1/1975 | Bruch | 360/36 |
| 3,931,638 | 1/1976 | Lentz | 358/127 |
| 3,935,381 | 1/1976 | Petrocelli | 358/180 |
| 4,079,417 | 3/1978 | Scudder | 358/180 |

Primary Examiner—Stuart N. Hecker
Assistant Examiner—Alan Faber
Attorney, Agent, or Firm—Carella, Bain, Gilfillan & Rhodes

[57] ABSTRACT

An arrangement is provided for modifying video signals so that the displayed image along a first directional axis has its dimensions changed relative to another directional axis perpendicular to the first axis. An illustrative system application of this arrangement is in the commercial television broadcasting of anamorphically recorded motion picture film program material. The arrangement utilizes electronic gating of a pair of analog line delays for each of the primary transmission colors to store the selected portion of each video line which corresponds to the portion of the motion picture scene used for the television scene. The stored portions of the lines are stretched to full line length by reading them out of the line delays at a slower rate thereby providing a television signal indicative of a image in true proportion. A controller provides various operating modes for changing the timing of the gating such that the selected portions of the video lines corresponds to different positions along the video lines to effect electronic panning of the motion picture scene. The utilization of a computer or a recording device in the illustrative system enhances performance and versatility.

10 Claims, 3 Drawing Figures

ARRANGEMENTS FOR MODIFYING SIGNALS INDICATIVE OF ANAMORPHIC IMAGES

BACKGROUND OF THE INVENTION

1. Field of the Invention

This invention relates to the modification of television signals to produce a displayed image wherein compression or expansion occurs along preselected axes. More particularly, the invention relates to electronic arrangements for providing an anamorphic conversion on television signals indicative of scenes anamorphically recorded on motion picture films to provide a virtually undistorted television image of true proportion.

2. Description of the Prior Art

In order to provide a panoramic effect from motion picture film having standard sized frames, an anamorphic optical lens is used to compress the recorded image along the horizontal axis. when the recorded image is projected on a screen, another compatible anamorphic lens expands the projected image horizontally to provide an illuminated motion picture screen in true proportion. The increased width of the illuminated motion picture screen provides the panoramic effect.

Because of the impact of television, it has become desirable to broadcast motion pictures for home viewing on television receivers. Since the ratio of height to width dimensions of television receiver displays do not correspond to that of commercial motion picture screens, only a portion of the motion picture image along its horizontal axis is required to provide a television display in true proportion. Accordingly an editing process is employed by using an anamorphic converter wherein the most subjectively pleasing portion of the motion picture image is selected for television transmission.

Conventional anamorphic converters utilize optical means to enlarge or expand photographically produced images in the horizontal direction. In addition to a slight nonlinearity in the expansion ratio produced by aberrations in the anamorphic lens, the optical system is moved by mechanical or electromechanical means and exhibits inertia and hysteresis which tend to reduce accuracy of the reaction speed and overall responsiveness of the control system. These drawbacks make subjectively unacceptable rapid panning or instantaneous "go to" modes of operation.

Another problem is that the image produced by the prior art systems show only the portion of the information present on the photographic film that corresponds to the television aspect ratio of 3 vertical units to 4 horizontal units. For real time processing and editing of motion pictures for television, it would be desirable to see all the information present on the photographic film and be readily able to identify the portion therein being selected for the television display.

It is an object of this invention to provide a television image from an anamorphic photographic image employing electronic means capable of high resolution and dimensional linearity.

A further object is to provide an electronic anamorphic converter whose operation is compatible with real time editing when desired but also compatible with preprogramming techniques.

SUMMARY OF THE INVENTION

Broadly, the invention takes the form of a method and apparatus wherein a video signal is recorded at a first rate for a selected portion of a T.V. line interval. The stored signal is then obtained at a second rate slower than the first rate so that each portion of the line occupies the time period of the entire T.V. line interval. When the altered signal is displayed by conventional television receivers, each selected portion of a line is stretched to a full line length.

In some of the other aspects of the invention, the video signal is indicative of an anamorphically recorded image and the difference in rates restores a selected portion of the image to true proportion. The program source of the video signal is a color motion picture film anamorphically recorded by compressing dimensions of the image in the horizontal direction relative to the dimensions in the vertical direction. The system application includes a film chain i.e. a projector and transducer which has a separate channel for each of the primary colors used in commercial color television. The apparatus for storing the video signal has three channels of the same capacity and electrical bandpass response.

In some of the further aspects of the invention, each channel has a memory unit which includes at least one analog delay line. The analog delay line is clocked at the first rate by a signal derived from a reference signal. Each memory unit includes a second analog delay line and the two analog delay lines alternate in function so that while one is ready to record the other is providing the output signal from the portion recorded during the previous T.V. line. The analog delay lines are "bucket brigade" type delay lines which shift analog voltage values through them at a transport rate.

In some of the still further aspects of the invention, first and second timing means cooperate with gating means to select and determine the size of the portion stored during each line interval. The first timing means is variable and determines the time when the memory begins to record. The second timing means is fixed and runs when the recording begins to determine the amount to be recorded. Control of the variable timing is effected through a counter arrangement made to be responsive to different inputs of varying or fixed rates indicative of one of two directions. The output of the counter is used as a preset for variable timing and presetting occurs only during vertical synchronization signals. The counter is an n-bit counter of which the more significant bits are used to preset while the least significant bits are used to control a variable delay. The variable delay acts as a fine vernier in adjusting the phase of the signal used to change the variable timer.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1:
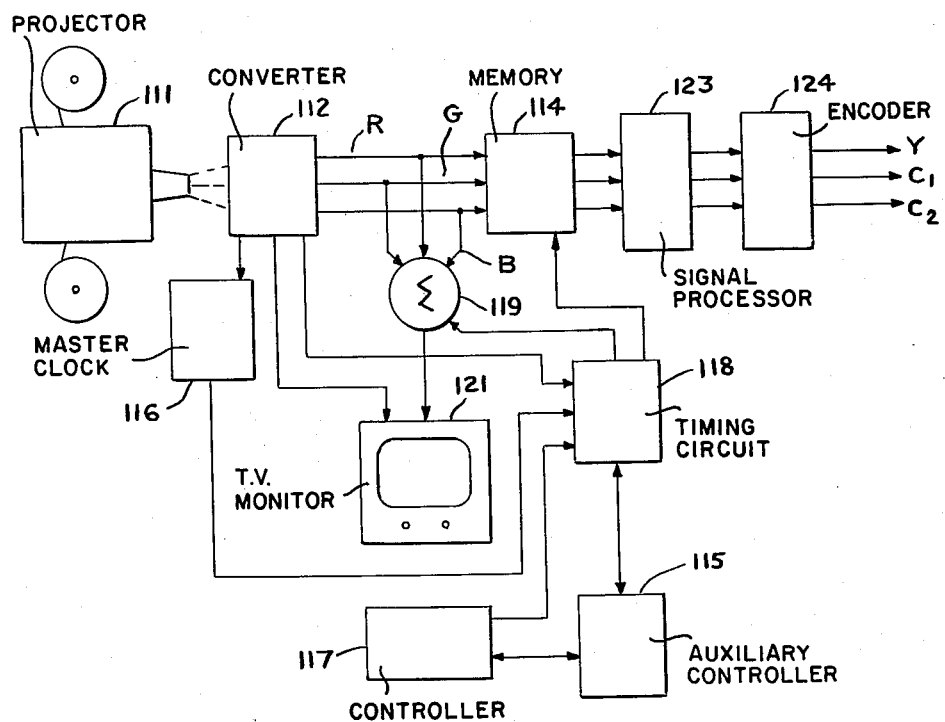
FIG. 1 is a block diagram of a system application of the invention.

FIG. 1 illustrates a typical system application of the invention wherein picture information for wide screen theater viewing is converted to a baseband video signal for display on conventional television receivers. In a studio utilization of this system, those skilled in the art may, of course, readily record this signal on magnetic tape and later use this signal to modulate a television carrier signal for program broadcasting purposes. The picture information of program material is a standard color film loaded into projector 111. Projector 111 provides an illuminated image as an input to converter 112. Converter 112 includes an optical system that divides the illuminated image into three images each corresponding to one of the primary illuminating colors. Each of these images is projected on to a target of a camera whose spectral response corresponds to the color of its image. Collectively these cameras produce a three component color signal; i.e. red, green and blue; as the output of converter 112. Memory 114 receives these signals and has the capacity for storing a standard line interval of each of the three signal components. Also included in converter 112 is conventional synchronizing circuitry from which the camera tubes operate in unison.

It should be pointed out that the nature of the video information along each horizontal scan line corresponds to the picture information recorded on the film in projector 111. More specifically, the utilization of standard anamorphic processes in the production of motion picture film will be evident in the video output signals of converter 112 so that the horizontal dimensions in a recorded scene are compressed relative to the vertical dimensions and, hence, the projected image will produce a similar effect in the three component output signal of converter 112. In order to provide a television signal which will provide a display in true proportion, an expansion process is required between the input and output of memory 114. However an inherent characteristic of this expansion process is that a portion of the picture information on the film is discarded. To provide a subjectively pleasing television display of meaningful information, those skilled in the art must provide an editing process wherein a portion of the picture information is subjectively selected for the television display while only the least meaningful information is discarded.

A primary feature of the arrangement of FIG. 1 is that the editing process is performed using electronic techniques with all the speed advantages attendant thereto. This editing process includes the cooperation of memory 114, master clock 116, controller 117, timing circuit 118, signal combiner 119 and television monitor 121. The remaining components in FIG. 1 in the video signal path includes signal processor 123 and encoder 124 which are both of conventional design and perform the conventional operation necessary to provide a standard composite color video picture signal suitable for broadcast immediately or for magnetic recording for subsequent broadcast. The characteristics of processor 123 may be changed by means of conventional "gain", "pedestal" and "gamma" potentiometers (not shown), as is well known in the art.

Another important and convenient feature which enables real time editing is the utilization of television display monitor 121. The video signal input to monitor 121 is produced by the output of signal combiner 119. Signal combiner 119 combines approximately the NTSC specified ratio of the three signal components produced. Typically, signal combiner 119 comprises a resistive network which combines the three video signal components to provide a luminance type signal for monochromatic monitor 121. Timing circuit 118 provides synchronous pulse signals as the remaining input to signal combiner 119 which is superimposed on the video. These pulses occur in accordance with the selected portion along the horizontal direction whose dimensions are compressed by a factor, most typically, of one-half. These pulses occur at the rate of two per video line, define a reading out interval of memory 114 as will be discussed hereinafter, and for present purposes identify the portion of picture information selected for the television output display from encoder 124. In order to provide a view in monitor 121 in true proportion, the vertical size of the monitor raster is reduced by one-half. The portion of the scene selected for display will be deliniated by two vertical lines of constant illumination intensity. Although the spacing between the line is fixed and determined by value of the anamorphic factor, the positions are selected by controller 117. It should be pointed out that the arrangement of FIG. 1 may be readily changed by those skilled in the art, as for example if monitoring were to be done using a color monitor.

Controller 117 provides three modes of operation for editing process. These modes are manual pan, cut pan, and automatic pan from a predetermined initial position to a final position at a fixed rate. In addition, other modes of operation are made available by using auxiliary controller 115 which comprises a computer in microprocessor form with associated memory. During these additional modes of operation, auxiliary controller 115 may serve as: a processing control unit which simulates mechanical inertia during automatic or manual panning, a speed multiplier during manual panning, a memorizer of all editing operations, called auto-learn, or a preprogrammed playback unit. The latter function is especially useful for direct broadcasting. In modes requiring computation, such as inertia simulation, auxiliary controller 115 may take the form of a computer. For this particular application microprocessor devices available in large scale integrated circuits are highly suitable.

Before a discussion is presented dealing with the internal circuitry of the components of FIG. 1, it should be pointed out that all logic circuitry described herein may be realized, in the illustrative embodiment of the invention, by using integrated circuits. Suitable circuits may be found, for example, in the "TTL Applications Handbook" August 1973 Edition, copyrighted 1973 by Semiconductor Components Group, Fairchild Camera and Instrument Corporation. Of Course, those skilled in the art may use transistor-transistor-logic from other manufacturers or other types of suitable logical circuitry for implementations utilizing the inventive principles herein presented.

Figure 2:
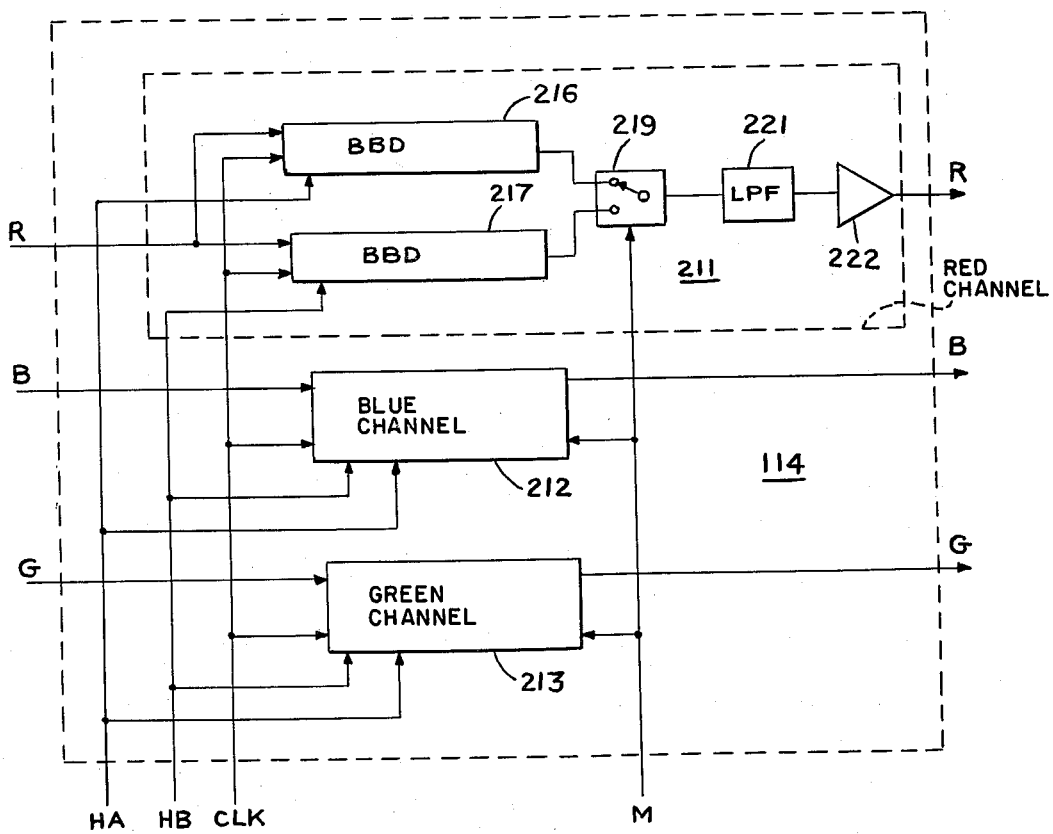
FIG. 2 is a detailed block diagram of the memory utilized in FIG. 1.

FIG. 2 illustrates the internal arrangement of memory 114. Basically, memory 114 has three channels 211–213 which are synchronously operated to expand selected portions of their respective video signals developed from the picture information originating from the film recording medium. Since the channels are identical, only channel 211 is depicted in detail. In channel 211, bucket-brigade delay (BBD) 216 and 217 are analog voltage storage devices fabricated by using charge couple device technology. In this application, there are actually two registers within each of delays 216 and 217 which store samples or analog voltage levels that are shifted through, or transported through, them at a rate determined by (1) a predetermined cooperation between the repetition rate at which they are being clocked, which is derived from master clock 116 of FIG. 1, and (2) their hold signals (HA and HB for respective delays 216 and 217). In addition, each register internally has a charge injection port at the input and an amplifier at the output. These devices are commercially available. One such device is the CCD 321 455/910-Bit Analog Shift Register made by Fairchild Instrument Corporation. Further information may be obtained from this corporation located in Mountain View, California.

Since a commercial quality video display of high resolution is of paramount importance, the two registers within each of delays 216 and 217 are operated in the multiplex mode by connecting their inputs together and using them in parallel. The multiplex operation provides sampling twice during each period of the clock signal and once by each register so that successive samples alternate between the two registers. If a clock rate or first repetition signal of 14.3 MHZ, or four times the 3.58 MHZ video reference signal, is used, a signal resolution of 910 bits per video line is obtained. Each of the delays, at the multiplexed double clock rate, provides a little in excess of 31 microseconds of delay storage capacity which corresponds to one-half of a horizontal scan line of picture information. When the stored picture information is obtained or read out of each delay, the relationship between the hold signal and clock rate reduces the transport rate of stored video information by one-half which in effect stretches the signal and dimensions of the video information by a factor of two. The overall effect is a video output signal, from each of the channels of memory 114, restored to true proportion. Furthermore, the effective sampling rate during the reading in of the input video signal is in excess of 28 MHZ therefore providing output video band width in excess of 7 MHZ as defined by the Nyguist criterion for each of the color and luminance components of a television signal. The result is extremely linear magnification without any loss of signal resolution as otherwise will occur if the signal was a color encoded T.V. signal.

A combination of two delays is used in each of channels 211-214 since as information is read out at the lower transport rate, information is being read in a lower sampling rate. Each delay is therefore available for every other horizontal scan line. Thus, alternation between two delays provides a delay for accepting new information while information is being read out from the other delay. Accordingly, multiplex switch 219 activated by the signal provided by timing circuit 118 of FIG. 1 on conductor M selects the appropriate delay to provide the video output signal. The remaining components in the video signal path are low pass filter, 221 and buffer amplifier 222.

Figure 3:
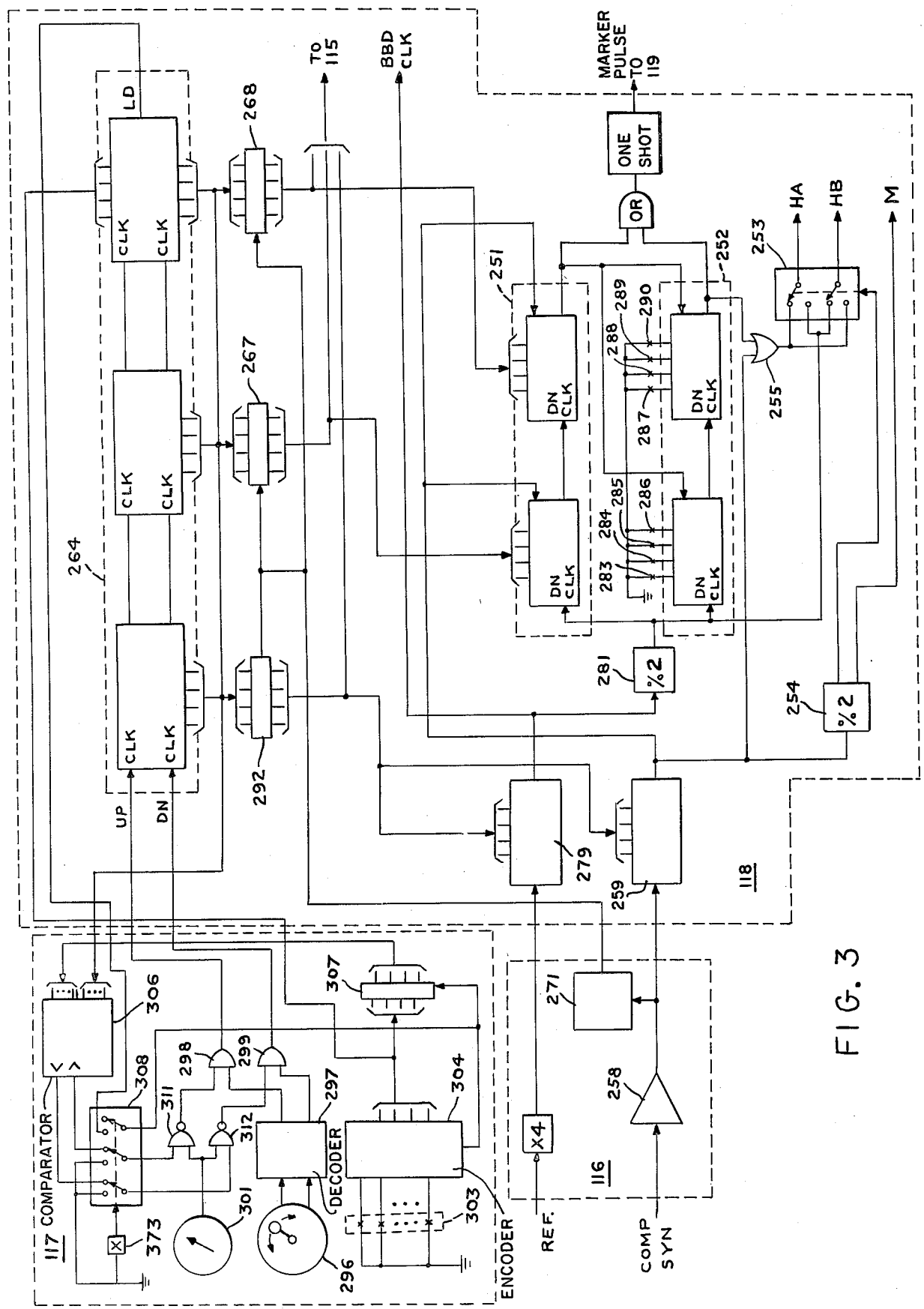
FIG. 3 is a detailed diagram of the timing circuitry and controller employed in the system of FIG. 1.

FIG. 3 depicts the internal circuitry of timing circuit 118 and controller 117 of FIG. 1. The composite synchronization signal and the reference sub-carrier signal of 3.58 MHZ from the synchronization circuitry utilized in converter 112 (not shown) of FIG. 1 provide the timing signal inputs for timing circuit 118. The control input signals for FIG. 3 are developed by controller 117 and/or device 115 of FIG. 1. The output signals of timing circuit 118 include the hold signals, designated HA and HB, and the multiplex signal (M). All of these signals are applied to memory 114 of FIG. 2.

In FIG. 3, two 8-bit down counters 251 and 252 cooperate to provide timing signals as the source of the hold output signals. These output signals are applied by the conductive paths completed by switch 253 whose two positions are controlled by divide-by-two circuit 254. Divider 254 acts in response to the horizontal trigger signals delivered from the composite synchronization signal by buffer amplifier 258 and variable delay 259. Basically, counter 251 is provided with variable starting positions and counts down to zero and indicates some to counter 252. Counter 252 then initiates a fixed count by counting down to zero. The variable count of counter 251, which provides a delay from zero to one-half of a horizontal scan line interval, established the beginning of a read-in interval for memory 114 while the fixed count of counter 252 determines the duration of the read-in interval of one-half a scan line interval. The variation in starting time of the half line read-in interval within the horizontal scan line interval of picture information provides the electronic equivalent of mechanically panning across the frame of picture film scene.

At the beginning of each read-in interval as initiated by the start of counter 252, OR gate 255 which provides the read-in signal to switch 253 also provides a horizontal blanking pulse to the switch from the output of delay 259. This pulse serves to enter into memory 114 a clamping potential (i.e. portion of the horizontal sync signal) for direct-current restoration while the output of counter 252 provides a read-in enabling signal for the video. During the occurence of each blanking pulse, counters 251 and 252 start and define the duration of the read-in-timing interval as they are stepped through their count by the clock signal output of divide-by-two circuit 281. Divider 281 in turn, is driven by the output of delay 279 in response to signal from master clock 116.

During the read-out interval which has the full duration of the time of a horizontal scan line of converter 112 of FIG. 1, the register of stored video information has a clock signal applied to its hold input. This clock signal is derived from the output of master clock 116 depicted in FIG. 3 with a frequency multiplier for increasing the 3.58 MHZ reference signal by a factor of four. For the read-out interval, the hold signal input to memory 114 of FIG. 2 arrives from master clock 116 via delay 279 and divide-to-two circuit 281. Since the input to divider 281 is applied as the clock signal input to memory 114 and the output signal of the divider is the hold signal for reading out of the same register, the latter allows only alternate pulses of the former to be effective thereby reducing the transport rate by one-half. The slower effective transport rate has the effect of electronically stretching the horizontal scan line by an amount which cancels out the anamorphic effect using during the recording of the image on the film.

Delay 279 is electrically identical to delay 259 and both include active integrated circuits and passive networks utilizing capacitive, inductive, and resistive elements. These delays are $T^2L$ compatible and commonly referred to as programmable logic delay lines. As may be ascertained from FIG. 3 both delays 259 and 279 receive the same programming or control inputs, the manner in which these delays operate will be deferred until the remaining circuitry of FIG. 3 is described.

The mechanical position of the portion of the film frame selected for television display is electronically generated by a 12-bit number produced by cascade connection of three 4-bit up/down counters in counter 264. The eight most significant bits of this count are used as the preset position of counter 251 to control its counting interval. In order to prevent diagonal shifting distortion in the displayed television signal, the 8-bit preset position is transferred by latches 267 and 268 from counter 264 to counter 251 upon the occurrence of each vertical synchronization pulse. The vertical synchronization pulses, which occur between field intervals of the television display format are obtained from the composite synchronization output of amplifier 258 by vertical synchronization separator 271.

In synchronism with each vertical synchronization pulse, latches 267 and 268 strobe the value of the most eight significant bits of counter 264 and retain this value which are indicated at their outputs. Within each field interval and upon the occurrence of the horizontal synchronization pulses which appear at the load inputs of counter 251, the counter is preset to a value serving to establish the beginning of the read-in interval of memory 114 of FIG. 2 when the counter down counts to zero and "dead ends" or "locks out". At this time, counter 251 produces a "0" output for the load inputs of counter 252 which also down counts but for a fixed interval of approximately one-half of a horizontal line scan interval. Switches 283–290 actually provides the appropriate combination of opens and closures to provide the preset for the fixed interval of counter 252. When counter 252 dead ends at zero, it provides a "1" output to OR gate 255 and terminates the hold signal ending the read-in interval.

The operation of the various elements heretofore described may now be readily described in order to facilitate understanding of the means by which the apparatus "stretches" a particular portion of an anamorphic image. When a horizontal sync pulse occurs at the output of counter 259 it triggers the loading of counter 251 (with the values from counters 267 and 268), and the horizontal sync pulse also proceeds through OR gate 255 into switch 253. The horizontal sync pulse will disable the hold signal HA so that BBD 216 will start to read-in video. When the horizontal sync ceases (and the video portion of the signal begins) the hold signal HA is enabled again and BBD 216 "holds" and ceases to read-in video. Meanwhile, counters 251 and 252 are clocked down in the manner heretofore described and the output of counter 252 is passed through OR gate 255 until the terminal count of counter 252 is reached signifying the end of the read-in interval. This output from counter 252 disables HA and, it can accordingly be seen that BBD 216 will read into memory a portion of the horizontal sync signal and all video occurring during the read-in interval as defined by the duration of counter 252. BBD 216 will cease to read-in video after the terminal count of 252 is reached and, upon the occurrence of the next horizontal sync pulse, the process will repeat itself with BBD 217 in view of the switching effect produced by divide-by-two counter 254.

It can be seen that divide-by-two counter 254 alternates the outputs HA and HB of switch 253 between the output of OR gate 255 (defining the read-in interval) and the output of divide-by-two counter 281 (defining the read-out mode). It can be seen that when HA is in the read-in mode causing BBD 216 to read-in video, HB is in the read-out mode causing BBD 217 to clock at a slower rate than BBD 216. Divide-by-two counter 254 simultaneously provides a signal M to switch 219 so that the latter is always connected to that particular BBD which has the slow read-out rate applied to it. Accordingly, it can be seen that the video output of switch 219 is "stretched".

Latch 292 is another 4-bit latch which strobes the four least significant bits during vertical synchronization pulses and provides the programming control inputs for variable delays 259 and 279. As is evident from the circuit diagram of FIG. 3 delay 259 intervenes in the application of the horizontal synchronization pulses in operating positions of switch 253 while delay 279 does the same for the reference signal which is used to clock memory 114 of FIG. 2 and to clock counters 251 and 252 through divider 281. Delays 259 and 279 provide tracking variable signal delays or variable phase shifts serving as a fine vernier in the panning motion of the picture frame to provide the television scene. In fact, the increment of delay associated with the least significant control signal bit is on the order of approximately 17.5 nanoseconds which is 16 times the reference signal input. When delays 259 and 279 are varying, the panning motion, although being incremented in descrete steps, is so fine to be visually preceived as smooth continuous motion.

As previously discussed, controller 117 of FIG. 1, depicted in FIG. 3 with internal circuitry provides control signals for timing circuit 118. These signals are basically used to clock and change the count of counter 264. For manual pan, controller 117 includes manually driven tachometer 296, decoder 297, and logic OR gates 298 and 299. Tachometer 296 is commercially available from Disc Instrument, Inc. in Costa Mesa, California and is generally known as an incremental shaft encoder for translating rotation motion of its shaft into an electrical pulse signal indicative of same. Decoder 297 performs certain logic and storage functions of these pulse signals to provide clock signals indicative of direction and rate of change of the rotational motion manually applied to the shaft of tachometer 296. This allows the operator of the system of FIG. 1 to follow the image as though he had a camera in his hand.

During the auto pan mode of operation, variable frequency oscillator 301 provides a signal whose frequency determines the panning rate or clocking rate of counter 264. The end positional limit of the pan is provided manually by a plurality of push button switches 303 which are converted into a 4-bit binary number corresponding to the four most significant bits of counter 264 by encoder 304. When the auto pan position is initiated, comparator 306 provides one of two output signals to indicate whether the magnitude of the manually entered end-of-pan position from encoder 304 which is retained by 4-bit latch 307 is greater or less than the magnitude of its other input produced by the output of counter 264. The appropriate output signal occurs and is applied via switch 308 to enable the appropriate one of NAND gates 311 and 312. At this time, the output signal from oscillator 301 will be steered to the appropriate input of counter 264 to produce the panning motion. Panning stops when the value of the count of counter 264 corresponds to the value stored in latch 307.

Panning is accomplished by moving a fixed portion, i.e. the selected television portion or portions to be taped, along the anamorphic scene so that, as the panning operation is performed, varying portions of the anamorphic scene will be dimensionally modified for undistorted TV presentation while other portions of the anamorphic scene will remain un-modified. The portion of the image which will be dimensionally modified for undistorted presentation is defined by the value set in counter 264 which is controlled by various modes of controller 117. It may be easily visualized that various values of counter 264 correspond to various points on the anamorphic scene, for example, low numbers corresponding to values near the left side of the image and high values of counter 264 corresponding to values near the right side of the image. It can be seen that whatever value is inserted in counter 264 will be transferred to counters 267 and 268 and ultimately to counter 251 to effect the start of the read-in interval. The variations in this starting point of the read-in interval coincide to the panning operation while the length of the portion of the image that is to be dimensionally modified for proper TV presentation will be defined by the value set in counter 252.

In the auto-pan mode, counter 264 is automatically incremented or decremented in accordance with information provided from comparator 306. Since the latter compares the position encoded by switches 303 and the position as indicated by the output of counter 264, it may be seen that counter 264 will be automatically incremented or decremented until the output of counter 264 equals that of the encoded position set by the switches 303. Since the number set in counter 264 corresponds to the start of the read-in interval which is the start or left edge of the dimensionally modified portion of the picture, it may be seen that the visual effect will be similar to that of panning a camera across a scene. While the dimensionally modified portion of the scene will always be of a certain length as defined by the setting of counter 252, when the panning motion stops the image will be stabilized rather than moving.

When the cut mode of operation is used the positions of the rotors in switch 308 assumes the other positions from those depicted in FIG. 3. Now the strobe pulse from encoder 304, in response to a set on switches 303, forces the four most significant bits on counter 264 to preset to the value of the encoder. As may be observed from FIG. 3 the positions of switch 308 are manually controlled by the closure of pan/cut switch 373. The cut mode will give the effect of discrete "jumps" in the stretched or dimensionally modified portion of the video as presented on TV moditor 121 rather than presenting a smooth transition motion as would be effected by use of either the manual or auto pan modes. However, when the dimensionally modified portions of the video are taped for ultimate presentation on a regular TV screen, the effect will be similar to that presented by splicing film together.

The arrangements and system that have been described provide a completely electronic approach to anamorphic film ratio conversion for television presentation which are superior to the conventional optical/mechanical approach. The system is convenient to use and is flexible so that it may be used for any size format or compression ratio. The system design features three separate storage channels each designed to work directly with its video signal produced by camera tubes or scan transducers. This arrangement enables utilization of three channels of the same bandpass characteristics, which are sufficiently high so as not to deteriorate color rendition and also provides flexibility since the system is not limited to any specific color broadcasting video signal format. For example, the system and arrangements may be employed to advantage in the NTSC, PAL, and SECAM systems of television broadcasting.

Moreover, the bandpass characteristics of the storage channels exceeds the response of commercial quality cameras so that the unique approach herein described does not limit the quality of the video resolution but rather the limitations are established by conventional broadcasting apparatus and systems.

Another approach is that the timing arrangements utilize the video reference signal and the horizontal and vertical synchronization signals as a timing base. This provides overall system synchronization while eliminating sources of drift and other timing errors which undoubtedly would produce annoying effects in the displayed image due to lack of stability.

Other attributes of the arrangements and system are that use is highly compatible with computerization technology; mechanical wear is not present and associated maintenance routines are not required; and performance is not subject to chromatic aberrations or any other optical courses of aberrations. Another attribute is design economy and relative simplicity without performance compromise. For instance analog delay lines eliminate the need for signal conversion techniques such as to digital form and the requisite amplitude approximations attendant thereto. However, those skilled in the art may utilize these inventive principles to advantage by utilizing digital signal storing medium with appropriate signal conversion.

It is to be understood that the arrangements disclosed in the foregoing are merely illustrative of the principles of the invention. The illustrative embodiment that is disclosed utilizes rather minimal complexity and yet provides certain desirable operational features. Accordingly, numerous and varied other arrangements including those of greater complexity and different operational features may be utilized by those skilled in the art without departing from the scope of the appended claims.

What is claimed is:

1. A real-time system for modifying a video signal indicative of anamorphic images stored in color on a motion picture film suitable for wide screen viewing having frames of a predetermined height to width ratio, the system comprising:

a motion picture projector for continuously providing illuminated images from the images of said motion picture film, said illuminated images having the same predetermined height to width ratio, wherein the dimensions of the images in the horizontal direction are compressed relative to the dimensions in the vertical direction;

transducing means for continuously responding to said illuminated images and for producing a representative video signal including line, field and frame intervals and associated horizontal and vertical synchronization signals and a reference signal, said transducing means including means for splitting the color image into spectral components and a plurality of photo-voltaic means each having a photo-sensitivity responsive to one of the spectral components of colored television transmission signals and for producing a representative video signal;

a plurality of separate storing means each connected to receive one of the video signals as produced, each of said storing means for filling at a first rate;

gating means responsive to the synchronization signals for enabling said separate storing means for a portion of each line interval corresponding to the same portion of a field interval; and output means for obtaining the content of said separate storing means indicative of a portion of each line interval at a second rate slower than said first rate to occupy the time period of the line interval.

2. A system in accordance with claim 1 wherein each of said memory units comprises at least one analog delay line, and the system further comprises clocking means for generating a first repetition signal at said first rate derived from the reference signal for clocking said analog delay lines.

3. A system in accordance with claim 2 wherein each of said memory units includes a second analog delay line and said gating means alternately enables the two analog delay lines in each of said memory units.

4. A system in accordance with claim 3 wherein each of said memory units includes switching means, connected to both of said analog delay lines and responsive to the horizontal synchronization signals, for selecting the content of one of said delay lines while the other of said delay lines is being enabled.

5. A system in accordance with claim 4 wherein each of said analog delay lines is a bucket brigade delay line including input means for sampling analog voltage values of the video signal applied thereto when enabled by said gating means.

6. A system in accordance with claim 5 further comprising first and second means for respectively providing a first timing interval and a second timing interval in succession during each line interval, and connected to receive a second repetition signal derived from the first repetition signal to reference the timing intervals thereto, said second timing means responding to the end of the first timing interval by starting the second interval and indicating same to said gating means to enable said bucket brigade delay lines for the duration of the second timing interval.

7. A real-time system for modifying a video signal indicative of anamorphic images stored in color on a motion picture film suitable for wide screen viewing having frames of a predetermined height to width ratio, the system comprising:

a motion picture projector for continuously providing illuminated images from the images of said motion picture film, said illuminated images having the same predetermined height to width ratio, wherein the dimensions of the images in the horizontal direction are compressed relative to the dimensions in the vertical direction;

transducing means for continuously responding to said illuminated images and for producing a representative video signal including line, field and frame intervals and associated horizontal and vertical synchronization signals and a reference signal, said transducing means including means for splitting the color image into spectral components and a plurality of photovoltaic means each having a photo-sensitivity responsive to one of the spectral components of colored television transmission signals and for producing a representative video signal;

a plurality of separated storing means, each connected to receive one of the video signals as produced, each of said storing means for filling at a first rate, each of said separate storing means further comprising at least one analog delay line and clocking means for generating a first repetition signal at said first rate derived from the reference signal for clocking said analog delay lines;

first gating means responsive to the synchronization signals for enabling said separate storing means for a portion of each line interval corresponding to the same portion of a field interval;

second gating means responsive to the synchronization signals for alternately enabling the analog delay lines in each of said separate storing means;

switching means connected to each of said analog delay lines and responsive to the horizontal synchronization signals for selecting the content of one of said analog delay lines while the others of said analog delay lines are being enabled;

first and second means for respectively providing a first timing interval and a second timing interval in succession during each line interval, and connected to receive a second repetition signal derived from the first repetition signal to reference the timing intervals thereto, said second timing means responding to the end of the first timing interval by starting the second interval and indicating same to said first gating means to enable all of said separate storing means for the duration of the second timing interval;

controlling means for providing a clocking signal output indicative of a direction and rate responsive to adjustable controls;

counting means responsive to the clocking signal output for maintaining a count thereof;

latching means for strobing the approximate value of the count upon the occurrence of a vertical synchronization pulse and presetting said first timing means in accordance with the variation in strobed value to change the duration of the first timing interval so that the stored content of said analog delay lines moves to a different location in the line intervals of the video signals thereby panning across the illuminated images; and output means for obtaining the content of said separate storing means indicative of a portion of each line interval at a second rate slower than said first rate to occupy the time period of the line interval.

8. A system in accordance with claim 7 wherein said counting means is an n-bit counter, where n is a positive integer for producing a count having a first plurality of bits and a second plurality of bits of lesser significance than any of the bits of said first plurality, and strobed value corresponds to the value of said first plurality.

9. A system in accordance with claim 8 further comprising delaying means for providing a variable phase shift in response to the value of said second plurality bits for providing fine increments of delay in the application of the reference signal and the synchronization signals respectively by said first and second timing means and by said switching means.

10. A real-time system for modifying a video signal indicative of anamorphic images stored in color on a motion picture film suitable for wide screen viewing having frames of a predetermined height to width ratio, the system comprising:

a motion picture projector for continuously providing illuminated images from the images of said motion picture film, said illuminated images having the same predetermined height to width ratio, wherein the dimensions of the images in the horizontal direction are compressed relative to the dimensions in the vertical direction;

transducing means for continuously responding to said illuminated images and for producing a representative video signal including line, field and frame intervals and associated horizontal and vertical synchronization signals and a reference signal, said transducing means including means for splitting the color image into spectral components and a plurality of photovoltaic means each having a photo-sensitivity responsive to one of the spectral components of colored television transmission signals and for producing a representative video signal;

monitoring means for continuously producing a display image having all the picture information of the anamorphic images from the video signal, said monitoring means including a signal combining means for mixing predetermined portions of the video signals;

a plurality of separate storing means, each connected to receive one of the video signals as produced, each of said storing means for filling at a first rate;

gating means responsive to the synchronization signals for enabling said storing means for at least a portion of each line interval corresponding to the same portion of a field interval, and said gating means for providing an output indicative of the end points of the stored portion of each line interval for said monitoring means to designate the portion of the display selected for output; and output means for obtaining the content of said storing means indicative of the portion of each line interval at a second rate slower than said first rate to occupy the time period of the line interval thereby stretching the stored portions to full line length.

* * * * *